(12) United States Patent
Simhon et al.

(10) Patent No.: US 9,851,875 B2
(45) Date of Patent: Dec. 26, 2017

(54) SYSTEM AND METHOD THEREOF FOR GENERATION OF WIDGETS BASED ON APPLICATIONS

(71) Applicant: Doat Media Ltd., Tel Aviv (IL)

(72) Inventors: Joey Joseph Simhon, Ramat-Gan (IL); Amir Taichman, Haifa (IL); Avi Charkam, Givataim (IL); Dvir Volk, Tel Aviv (IL)

(73) Assignee: Doat Media Ltd., Tel Aviv (IL)

( * ) Notice: Subject to any disclaimer, the term of this patent is extended or adjusted under 35 U.S.C. 154(b) by 179 days.

(21) Appl. No.: 14/556,672

(22) Filed: Dec. 1, 2014

(65) Prior Publication Data

US 2015/0186000 A1  Jul. 2, 2015

Related U.S. Application Data

(60) Provisional application No. 61/920,782, filed on Dec. 26, 2013.

(51) Int. Cl.
  *G06F 15/00* (2006.01)
  *G06F 13/00* (2006.01)
  *G06F 3/0484* (2013.01)

(52) U.S. Cl.
  CPC ................. *G06F 3/0484* (2013.01)

(58) Field of Classification Search
  CPC ...... G06F 9/4448; G06F 1/1626; G06Q 30/02
  USPC .......................... 715/739, 751, 764, 719–722
  See application file for complete search history.

(56) References Cited

U.S. PATENT DOCUMENTS

| | | | |
|---|---|---|---|
| 6,216,141 B1 | 4/2001 | Straub et al. | |
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,565,383 B2 | 7/2009 | Gebhart et al. | |
| 7,599,925 B2 | 10/2009 | Larson et al. | |
| 7,636,900 B2 | 12/2009 | Xia | |
| 7,792,815 B2 | 9/2010 | Aravamudan et al. | |
| 7,797,298 B2 | 9/2010 | Sareen et al. | |
| 7,958,141 B2 | 6/2011 | Sundaresan et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,190,474 B2* | 5/2012 | Lerman | G06Q 30/00 705/14.41 |
| 8,531,423 B2* | 9/2013 | Anzures | G06F 1/1626 345/173 |
| 2004/0122674 A1 | 6/2004 | Bangalore et al. | |
| 2004/0186989 A1 | 9/2004 | Clapper | |
| 2006/0206803 A1 | 9/2006 | Smith | |
| 2007/0112739 A1 | 5/2007 | Burns et al. | |

(Continued)

*Primary Examiner* — Kevin Nguyen
(74) *Attorney, Agent, or Firm* — M&B IP Analysts, LLC

(57) ABSTRACT

A method and system for generation of widgets based on mobile applications are provided. The method includes receiving from a user device a request to analyze at least one application on the user device; analyzing the at least one application to identify at a plurality of functions in the at least one application; analyzing each of the identified plurality of functions to identify contextual content items; generating at least one widget respective of at least one preferred function and preferred contextual content item of the identified functions and contextual content items; and displaying the widget on a display of the user device.

17 Claims, 4 Drawing Sheets

(56) References Cited

U.S. PATENT DOCUMENTS

| | | | |
|---|---|---|---|
| 2009/0249359 A1* | 10/2009 | Caunter | G06F 9/4448 |
| | | | 719/315 |
| 2010/0094854 A1 | 4/2010 | Rouhani-Kalleh | |
| 2010/0198697 A1* | 8/2010 | Brown | G06Q 30/02 |
| | | | 705/14.73 |
| 2011/0131205 A1 | 6/2011 | Iyer et al. | |
| 2012/0331108 A1 | 12/2012 | Ferdowsi et al. | |
| 2013/0139073 A1* | 5/2013 | Crames | G06F 9/44505 |
| | | | 715/760 |

\* cited by examiner

SYSTEM AND METHOD THEREOF FOR GENERATION OF WIDGETS BASED ON APPLICATIONS

CROSS-REFERENCE TO RELATED APPLICATIONS

This application claims the benefit of U.S. Provisional Application No. 61/920,782 filed on Dec. 26, 2013, the contents of which are hereby incorporated by reference.

TECHNICAL FIELD

The invention generally relates to techniques for analyzing applications executed over a user device, and more specifically to techniques for generating widgets respective of the applications executed over the user device.

BACKGROUND

The use of mobile devices, such as smart phones, mobile phones, tablet computers, and other similar devices, has significantly increased in past years. Such mobile devices allow access to a variety of application programs also known as "applications" or "apps." The applications are usually designed to help a user of a mobile device to perform a specific task. Applications may be bundled with the computer and its system software, or may be accessible, and sometimes downloadable, from a central repository such as, for example, the App Store™ by Apple®.

Through such applications' repositories, users can download applications for virtually limitless purposes, limited only by the amount of memory available on the users' phones. Applications exist for social media, finance, news, entertainment, gaming, and more. Some applications serve multiple purposes and/or offer multiple types of content.

Because of the availability of these applications, users typically have multiple applications on their mobile device which they infrequently use. Additionally, applications with multiple features typically offer functions and content the users infrequently use. As a result of this applications clutter, overall use of users' preferred applications decrease. As such, advertising revenue from applications is decreased as well.

It would be therefore advantageous to provide a solution that would increase the usage of applications by users.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain exemplary embodiments include a method for generation of widgets based on mobile application. The method comprises receiving from a user device a request to analyze at least one application on the user device; analyzing the at least one application to identify at a plurality of functions in the at least one application; analyzing each of the identified plurality of functions to identify contextual content items; generating at least one widget respective of at least one preferred function and preferred contextual content item of the identified functions and contextual content items; and displaying the widget on a display of the user device.

Certain exemplary embodiments also include a system for generation of widgets based on mobile applications. The system comprises a processing unit; and a memory connected to the processing unit, the memory containing instructions that when executed by the processing unit, configure the system to: receive from a user device a request to analyze at least one application on the user device; analyze the at least one application to identify at a plurality of functions in the at least one application; analyze each of the identified plurality of functions to identify contextual content items; generate at least one widget respective of at least one preferred function and contextual content item of the identified functions and contextual content items; and display the widget on a display of the user device.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
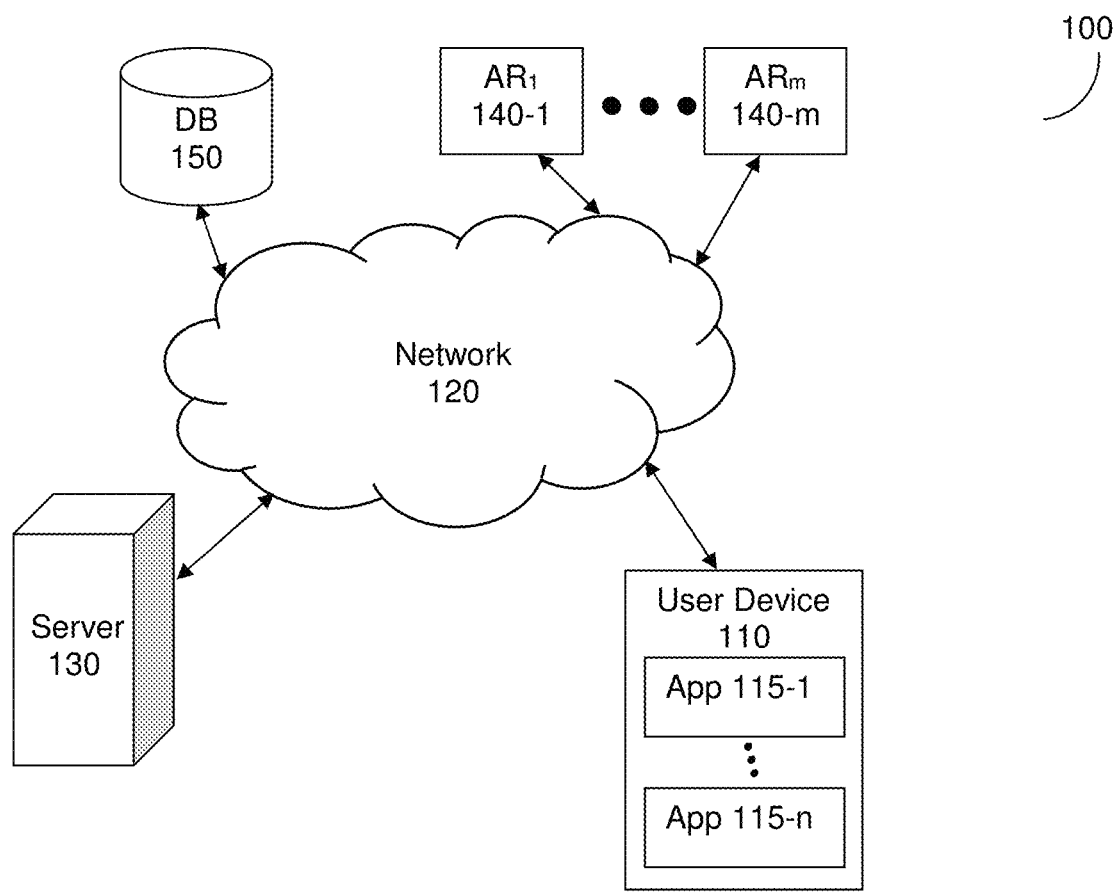
FIG. 1 is a schematic diagram of a network system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 depicts an exemplary and non-limiting schematic diagram of a network system 100 utilized to describe the various disclosed embodiments. As shown in FIG. 1, a user device 110 is connected to a network 120. The user device 110 may be a smart phone, a mobile phone, a laptop, a tablet computer, a wearable computing device, a personal computer (PC), a smart television, and the like. The user device 110 is installed with a plurality of applications (apps) 115-1 through 115-n (collectively referred to hereinafter as applications 115 or individually as an application 115). The applications may be mobile (native) applications.

According to one embodiment, the applications are downloaded from one or more applications repositories 140-1 through 140-m which are also connected to the network 120. An example for an applications' repository is the AppStore® by Apple®. The network 120 may be a local area network (LAN), a wide area network (WAN), a metro area network (MAN), the Internet, the worldwide web (WWW), a wireless network, a wired network, a cellular network, the like, and any combinations thereof.

In one embodiment, a server 130 is also connected to the network 120. The server 130 is configured to identify applications 115 executed over the user device 110. According to one embodiment, in order to allow such identification, a description of the application 115 is received as an input from a user of the user device 110 and the identification of the application 115 is achieved based on the received description. In another embodiment, an identifier and/or metadata associated with each installed application 115 is sent to the server 130. Such data can be provided upon installation, execution, and the like of an application 115.

An application's 115 identifier and/or metadata can be collected by an agent (not shown) operable in the user device 110. An agent may be a dedicated application, script, or any program code stored in the user device's memory and is executable, for example, by the user device's 110 operating system. The metadata of an application 115 may include, for example, an application's name, creator, type, description, identifier, and so on.

The server 130 is further configured to identify the functions or otherwise features provided by the applications 115 in order to differentiate between the different contextual content items within the application 115 based on their context. A contextual content item is a content item within an application 115 that can be identified as relating to a particular context. For example, in a news application each news article is typically identified as a different contextual content item. As another embodiment, in a social networking application, the social contacts and new feeds may be identified as different contextual content items. In a further embodiment, the differentiation is made based on an analysis of the user's interaction with the content items.

In another embodiment, the server 130 may analyze multiple applications 115 and identify the different contexts of the separate applications 115. The differentiation is made by analyzing the user's interactions with the applications 115. For example, in a case where a user sends a search query from the user device 110 through an application 115, the application 115 may be classified as a search engine. According to another embodiment, the differentiation is made by analyzing the applications' 115 programming interface (API) and matching the API to similar APIs existing in a database 150. According to yet another embodiment, the differentiation is made by analyzing the application's structure. According to yet another embodiment, the differentiation is made by analyzing the application's metadata to determine different features or functions provided by the application.

Based on the contextual content items, the server 130 is also configured to generate one or more widgets. A widget is a stand-alone application with limited functionality that can be installed and executed on the user device 110 or within a webpage accessed by the user device 110. The widgets may comprise links (e.g., hyperlinks) to content existing over the network 120 related to the applications 115.

According to one embodiment, a generated widget is configured to communicate through the network 120 with the respective applications repository 140. The communication allows the widgets to be updated with changes in the application 115 when a network connection is available.

According to an embodiment, the widget is generated responsive to a selection of one or more contextual content items received from the user device 110. The selection may be received as a user gesture over one or more contextual context items displayed on the user device 110. A user's gesture may be, for example, a scroll or a tap on a certain area of the application 115 displayed on the display of the user device 110. The widget is then displayed over the display of the user device 110. In an embodiment, the displayed widget may communicate with the application 115 when the user device 110 is offline to be updated with changes created by the user.

According to another embodiment, a link to the widget is sent to the user device 110. The link may be represented by an icon generated by the server 130. In a non-limiting example, a user clicks on a news story about computer technology in a news application. Then, a widget displays over the display of the user device 110, containing more information pertaining to the news story, such as other new technologies, more details on the reported technology, and the like. In another embodiment, an icon is generated by the server 130 to link to the widget and is sent to the user device 110 as a text message, email, or other communicative means.

The server 130 typically includes a processing unit and memory containing instructions to be executed by the processing unit. The processing unit may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions described herein.

Figure 2:
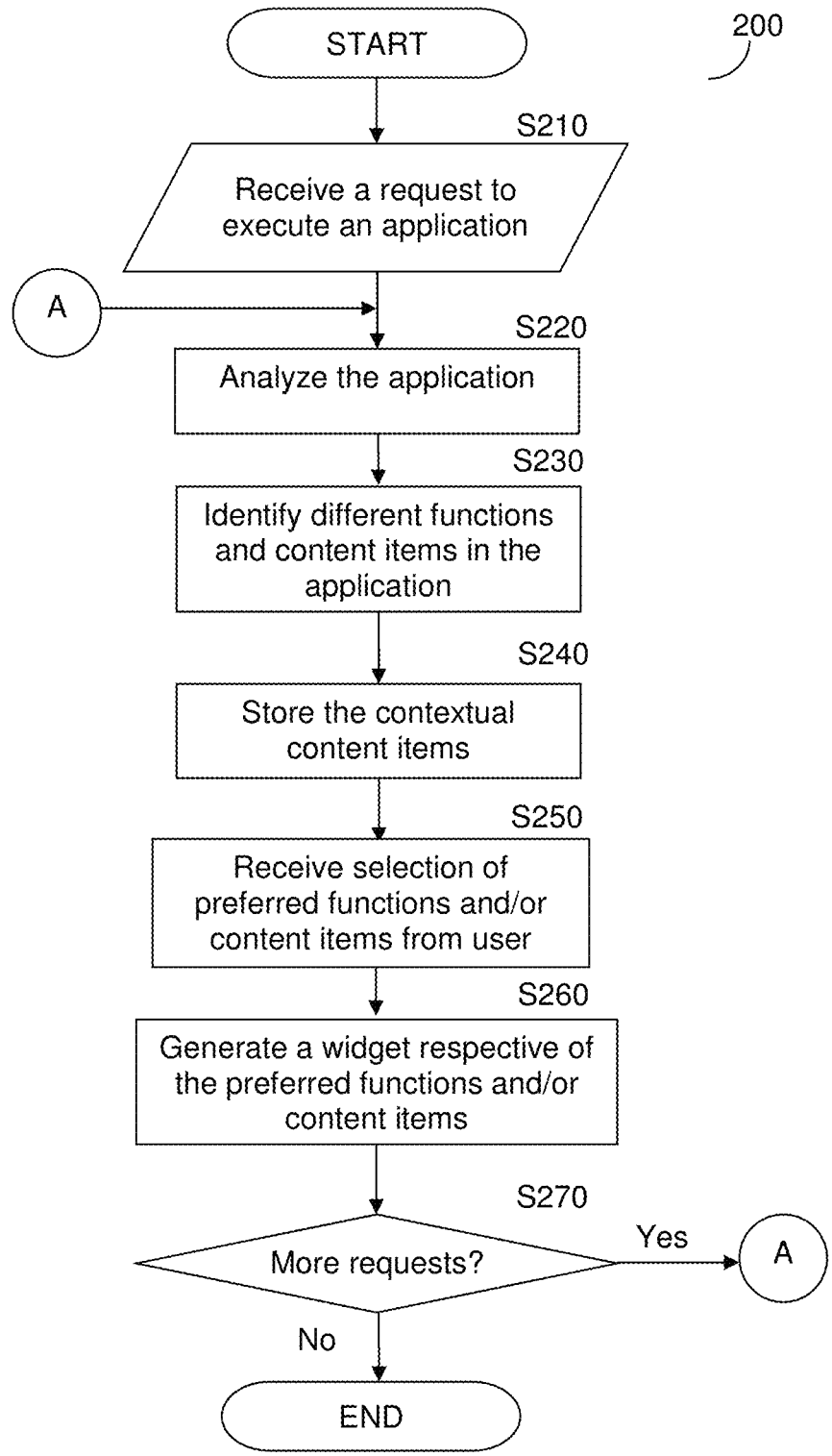
FIG. 2 is a flowchart describing the operation of a method for identifying preferred contextual content items from applications respective of user selection according to an embodiment.

FIG. 2 depicts an exemplary and non-limiting flowchart 200 of a method for identifying preferred contextual content items from applications based on user selection according to an embodiment.

In S210, a request to analyze at least one application on a user device, for example, application 115 on the user device 110, is received. This request may be initiated upon user interaction with the application 115. For example, a request may be sent when a user opens an application 115, taps on an application 115, or any other user's gesture with respect to the application. In another embodiment, the request can be initiated at predetermined time intervals.

In S220, the requested application 115 is analyzed to identify its functions and different contextual content items. For example, when analyzing the Facebook® app, functions such as the contacts list, newsfeeds, photo albums, and the like may be identified. Contextual content items such as phone numbers, status updates, individual photos, and the like may also be identified. An exemplary embodiment for performing S220 is discussed in FIG. 3.

In S230, the different functions and/or contextual content items identified in the application 115 are displayed to the user. These contextual content items may be displayed in a separate application, in an overlay over the requested application, or by any other means on the user device 110. In S240, user selections of the functions and/or contextual content items preferred by the user are received.

In S250, the preferred selected functions and/or contextual content items are stored. According to an embodiment, the preferred functions and/or contextual content items are stored in a data storage unit, for example, the database 150.

Figure 4:
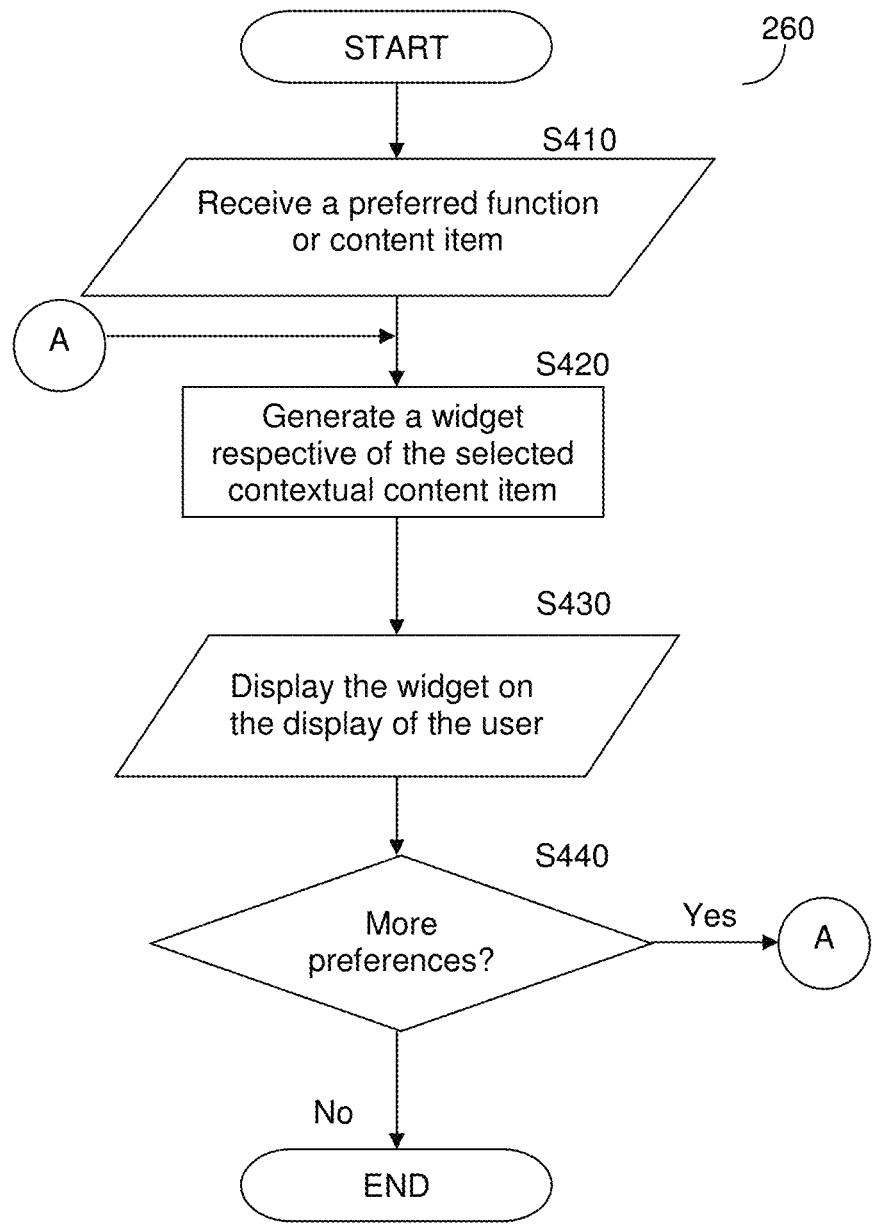
FIG. 4 is a flowchart describing the operation of a method for generation of widgets based on applications according to an embodiment.

In S260, a widget is generated respective of the preferred functions and/or contextual items, as described in detail in FIG. 4, and stored therewith in the database 150. In S270, it is checked whether there are additional requests and if so, execution continues with S220; otherwise, execution terminates.

Figure 3:
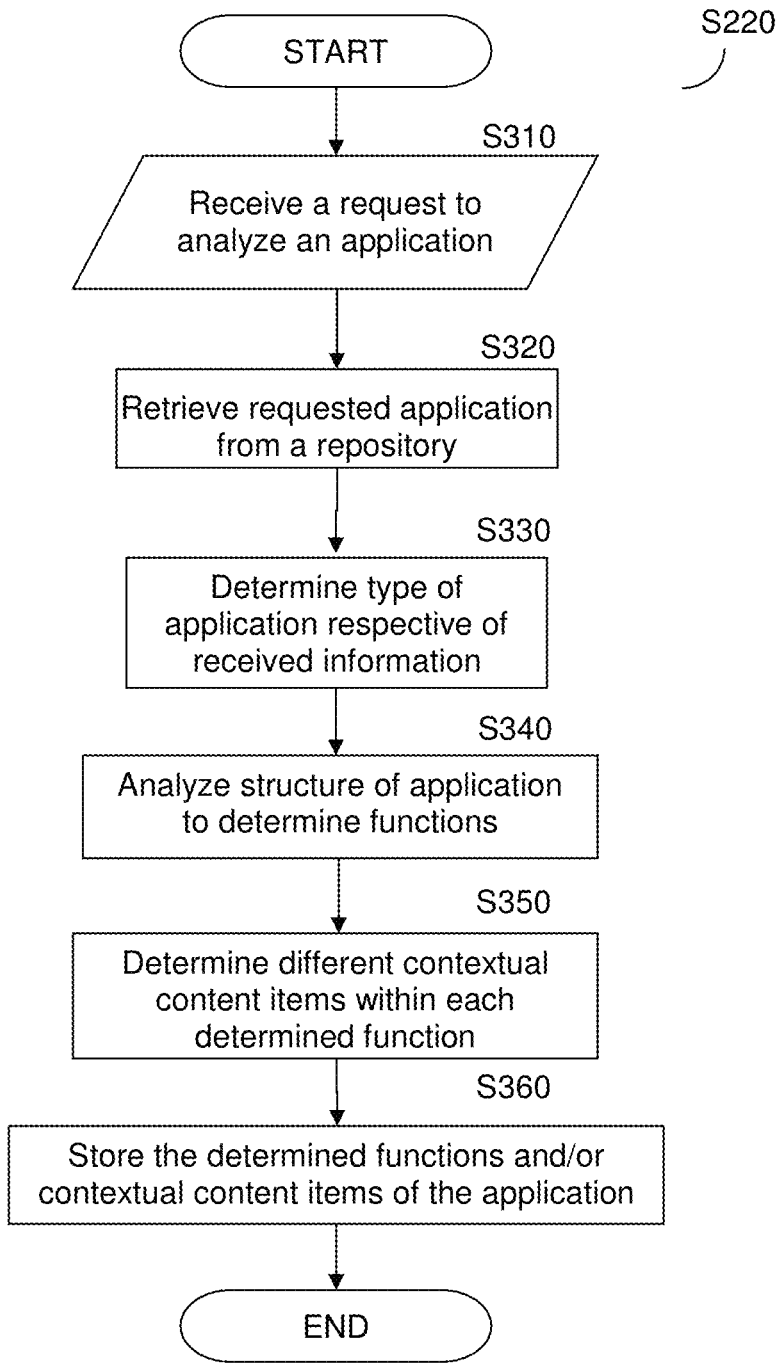
FIG. 3 is a flowchart describing the operation of a method for identifying preferred contextual content items from applications independent of user selection.

FIG. 3 depicts an exemplary and non-limiting flowchart S220 of a method for identifying preferred contextual content items from applications without user selection according to an embodiment.

In S310, a request to analyze at least one application on a user device, for example, application 115 on the user device 110, is received. This request may include an application identifier, application metadata, and the like. The request may also include information related to the user device 110, e.g., device's type, an operating system's type, and so on.

In S320, the application noted in the request is retrieved, for example, from a global application repository (e.g., AppStore®) or a local application repository (e.g., database 150). The local application repository may include a list of index applications. Collectively or alternatively, information describing the application can be obtained from external sources (e.g., developers' websites, blogs, etc.).

In S330, a type of the application is determined based on the retrieved information or received request. For example, the type of the application may be identified in the application's metadata. A type of the application may be for example, a search engine, gaming, shopping, news, and the like.

In S340, the structure of the requested application is analyzed to determine its functions. This can be achieved by analyzing APIs associated with application, metadata of application, and/or by analyzing the application's structure. For example, when analyzing the Facebook® app, the contacts list, newsfeed, photo albums, and the like may be determined as separate functions. As another example, when analyzing a news app, Sports, Weather, and Entertainment may be determined as separate functions. In an embodiment, the analysis to be performed based on the determined application's type.

In S350, different contextual content items within each determined function are determined. In an embodiment, this is performed by traversing links (e.g., hyperlinks) to content items available through each function. For example, in the Facebook® app phone numbers, status updates, individual photos, and the like may also be identified as different contextual content items of the respective contacts list, newsfeed, photo albums functions.

In S360, the determined functions and/or contextual content items of the application are stored. According to an embodiment, the preferred functions and/or contextual content items are stored in a data storage unit, for example, the database 150.

FIG. 4 depicts an exemplary and non-limiting flowchart S260 of a method for generation of widgets based on applications and providing the widgets to a user device according to an embodiment. In S410, at least one preferred function and/or contextual content item in an application 115 is received from the user device 110. The at least one preferred function and/or contextual content item may be identified with or without user selection as described in further detail hereinabove in FIG. 2. The preferred function and/or contextual content item may be received as a query from the user device 110. In an exemplary embodiment, the at least one preferred function and/or contextual content item is received by the server 130.

In S420, a widget is generated respective of the selected contextual content item. The widget is a stand-alone application with limited functionality which may comprise links to content existing over the network 120 related to the at least one preferred function and/or contextual content item.

In S430, the widget is sent to the user device 110 for display on the display of the user device 110. The widget may be installed and executed on the user device 110 or within a webpage accessed by the user device 110. In S440, it is checked whether there are additional preferred functions and/or contextual content items from the user device 110 and if so, execution continues with S420; otherwise, execution terminates.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generation of widgets on a user device based on at least one mobile application within the user device, comprising:

receiving from the user device a request in digital format to analyze the at least one application of the user device;

analyzing, automatically and directly in response to the digital format request, the at least one application to identify at a plurality of functions in the at least one application;

analyzing each of the identified plurality of functions to identify contextual content items;

generating at least one widget for at least one preferred function and preferred contextual content item based on the identified functions and contextual content items; and displaying an icon representing the widget on a display of the user device, wherein activation of the icon invokes the widget.

2. The method of claim 1, wherein the request to analyze at least one application is initiated by an interaction with the application by a user.

3. The method of claim 1, wherein the request to analyze at least one application is initiated at a predetermined time interval.

4. The method of claim 1, wherein the at least one contextual content item comprises a content item within one of the plurality of functions that is identifiable as relating to a particular context.

5. The method of claim 1, wherein the least one widget comprises a stand-alone application with limited functionality, wherein the least one widget is installed and executed on at least one of: the user device and a webpage accessed by the user device.

6. The method of claim 1, wherein the at least one preferred function and contextual content item are selected by the user.

7. The method of claim 1, further comprising:

analyzing at least one of: an API of the application, a metadata of the application, a structure of the application to identify the plurality of functions.

8. The method of claim 7, further comprising:

traversing through links in each of the identified functions to determine the hyperlinks.

9. A non-transitory computer readable medium having stored thereon instructions for causing processing circuitry to execute a process for generation of widgets on a user device based on at least one mobile application within the user device, the process comprising:

receiving from the user device a request in digital format to analyze the at least one application of the user device;

analyzing, automatically and directly in response to the digital format request, the at least one application to identify at a plurality of functions in the at least one application;

analyzing each of the identified plurality of functions to identify contextual content items;

generating at least one widget for at least one preferred function and preferred contextual content item based on the identified functions and contextual content items; and displaying an icon representing the widget on a display of the user device, wherein activation of the icon invokes the widget.

10. A system for generation of widgets on a user device based on at least one mobile application within the user device, comprising:

processing circuitry; and a memory connected to the processing unit, the memory containing instructions that when executed by the processing circuitry , configure the system to:

receive from the user device a request in digital format to analyze the at least one application of the user device;

analyze, automatically and directly in response to the digital format request, the at least one application to identify at a plurality of functions in the at least one application;

analyze each of the identified plurality of functions to identify contextual content items;

generate at least one widget respective for at least one preferred function and contextual content item based on the identified functions and contextual content items; and display an icon representing the widget on a display of the user device, wherein activation of the icon invokes the widget.

11. The system of claim 10, wherein the request to analyze at least one application is initiated by an interaction with the application by a user.

12. The system of claim 10, wherein the request to analyze at least one application is initiated at a predetermined time interval.

13. The system of claim 10, wherein the at least one contextual content item comprises a content item within one of the plurality of functions that is identifiable as relating to a particular context.

14. The system of claim 10, wherein the least one widget comprises a stand-alone application with limited functionality, wherein the least one widget is installed and executed on at least one of: the user device and a web page accessed by the user device.

15. The system of claim 10, wherein the at least one preferred function and contextual content item are selected by the user.

16. The system of claim 10, wherein the system if further configured to:

analyze at least one of: an API of the application, a metadata of the application, a structure of the application to identify the plurality of functions.

17. The system of claim 16, wherein the system if further configured to:

traverse through links in each of the identified functions to determine the hyperlinks.

\* \* \* \* \*